INFORMATION RETRIEVAL

Filed Dec. 24, 1963 2 Sheets-Sheet 1

| TERMS OF RECORD | PARTIAL TERMS SOUGHT | | |
|---|---|---|---|
| | AB | ABD | BCD |
| ABCD | X | X | (X) |
| ABDE | X | (X) | |
| ABFK | (X) | | |

| TERMS OF RECORD | PARTIAL TERMS SOUGHT | | |
|---|---|---|---|
| | AB | ABD | BCD |
| ABCD | X | X | (X) |
| ABE | (X) | | |
| ABFK | X | | |
| ABDL | X | (X) | |

| TERMS OF RECORD | PARTIAL TERMS SOUGHT | | |
|---|---|---|---|
| | ACD | CF | ADF |
| ADE | | | |
| CFK | | (X) | |
| CEK | | | |
| ACDF | (X) | X | X |
| CFK | | | |
| ACDF | X | X | (X) |

INVENTOR.
HANS P. LUHN

BY Lester W. Clark

ATTORNEY

United States Patent Office 3,293,619

Patented Dec. 20, 1966

3,293,619

INFORMATION RETRIEVAL

Hans P. Luhn, Armonk, N.Y., assignor to International Business Machines Corporation, New York, N.Y., a corporation of New York Filed Dec. 24, 1963, Ser. No. 333,076

5 Claims. (Cl. 340—172.5)

This invention relates to information retrieval apparatus, and particularly to apparatus for searching a record comprising a plurality of terms to determine the presence or absence therein of a certain combination of partial terms.

One of the difficult problems in information retrieval has been termed the matrix problem. This problem may best be described by means of an example. Consider the following chemical formula, which is taken from Patent No. 2,894,973:

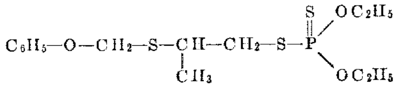

In searching a record, which might be a set of punched cards, a magnetic tape record, or the like, to locate the records of chemical compounds having the same or nearly the same formula as the one above, the searcher might seek a combination of two partial terms, one of the partial terms consisting of a methyl group ($CH_2$) connected to a sulfur atom (S) connected to a phosphorus atom (P). The other partial term would consist of a methyl group ($CH_2$) connected to a sulfur atom (S). In searching records mechanically, if the record contained the complete formula stated above, the searching mechanism might utilize the methyl and sulfur combination from the group connected to the phosphorus atom to satisfy the requirement for the second partial term, and then there would be no group left in the record capable of satisfying the first partial term, and the matching of the formula with the two partial terms required would not be found.

The patent to Luhn et al., No. 2,994,429, shows in Example #4, beginning at column 54, the retrieval of a combination of two partial terms appearing in any order in a record including other intervening data. However, the apparatus disclosed therein is not practical for use with combinations of three or more partial terms, which may appear in any of several permutations. Furthermore, the apparatus of that patent is not practical for seeking combinations of partial terms in which one partial term is duplicated by or within another partial term, as in the example above.

An object of the present invention is to provide improved informational retrieval apparatus.

Another object is to provide informational retrieval apparatus capable of solving the matrix problem.

A further object is to provide informational retrieval apparatus for ascertaining the presence or absence, in a record comprising at least $n$ terms, each containing a plurality of elements, of a set of $n$ terms containing, in one-for-one correspondence, a particular set of $n$ partial terms, where $n$ is an integer greater than 2, and at least one partial term includes a plurality of elements.

Another object is to provide improved informational retrieval apparatus of the type described, which is useful in situations where one partial term is contained in another partial term.

The foregoing and other objects of the invention are attained in the apparatus described herein. That apparatus includes matching register means for comparing each term of the record simultaneously with all of the partial terms of the combination to be retrieved and producing signals identifying each partial term found within a term of the record. These identifying signals from the matching register means are transmitted to an array of storage register means, comprising $n-1$ sets with $n$ individual registers in each set. When the apparatus starts to scan a record, the identifying signals from the matching register means are transmitted to a particular set of storage registers. Upon identification of one or more of the sought partial terms in a term of the record, those identifications are stored in the storage registers corresponding to the particular partial term or terms so recognized. If two or more partial terms are identified in the same term of the record, then both identifications will be stored in respective storage registers. Whenever one or more identifications is stored in a set of storage registers the identifying signals from the matching register means of the unidentified partial terms are transferred to an unoccupied set of storage registers. After each set of storage registers has stored therein a record of at least one identification of an element, then the output of the matching register means for the one partial term still unidentified is transferred to an output line. When that one partial term is identified the information sought has been retrieved, and a signal appears on the output line.

The storage registers control a complex electrical network including a signal path for every permutation of partial terms which can satisfy the combination being sought. When all the terms of the combination have been matched, one of the paths through the network is completed and an output signal is produced indicating that the combination sought has been found in the record.

Other objects and advantages of the invention will become apparent from the specification set forth below, taken together with the accompanying claims and drawings.

*FIGS. 1–2*

These figures are intended as illustrations of the type of information retrieval or searching problem to be solved by the present invention, and of the characteristics of the information retrieved which constitute a solution to such a problem.

Figures 1, 2, 3, 4, 5:
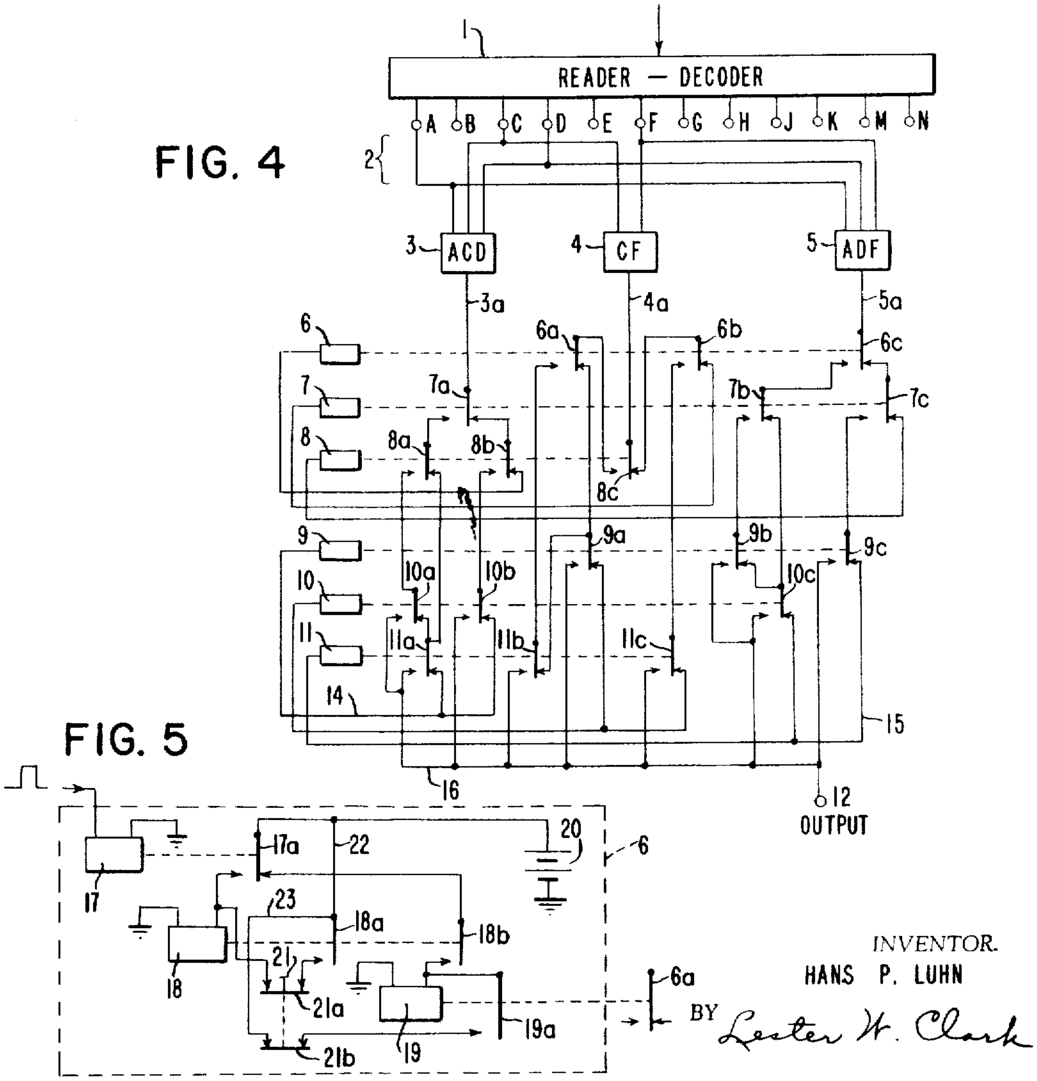
FIG. 1 is a table illustrating a search of a record for a combination of partial terms involving the matrix problem.
FIG. 2 is a table similar to FIG. 1, illustrating another search.
FIG. 3 is a table similar to FIGS. 1 and 2 illustrating still another search of a record which may be carried out by the apparatus of FIG. 4.
FIG. 4 is a somewhat schematic electrical wiring diagram of an apparatus embodying the invention for carrying out the search illustrated in the table of FIG. 3.
FIG. 5 is a wiring diagram showing the construction of a relay shown in FIG. 4 as a single block for the sake of simplicity.

There appears at the left of FIG. 1 a column headed "Terms of Record" and at the right of the figure, three columns under the general heading "Partial Terms Sought." The expression "term" as used in this specification is intended to include generically the expression "word" as used generally in connection with computers, but the expression "term" is not intended to be limited to the same meaning as the term "word." For example, the expression "term" may include a group of words, and it may also include a part of a word. In the simple example illustrated in FIG. 1, each term of the record is shown as consisting of four alphabetical characters, and each of the set of partial terms which is sought in this search consists of two or three alphabetical characters. More typically, each term of the record being searched will contain many more characters than each of the partial terms being sought. However, the only absolute requirement in this respect is that some terms of the record must contain at least as many characters as the largest term being sought.

The set of partial terms being sought consists of three groups of characters, namely AB, ABD and BCD. The first term of the record being scanned is ABCD. It may readily be seen that this term includes each of the three partial terms being sought. Consequently, an X is placed in each of the three columns under the respective partial terms. The next term of the record is ABDE, which includes each of the first two partial terms being sought so that X's are placed in the first two columns only.

The third term of the record is ABFK, which includes only the first partial term so that an X appears only in the first column. At the end of the search of these three terms of the record, there has been found a set of three terms in the record containing, in one-for-one correspondence, the set of three partial terms which was sought, as indicated by the circled X's. In other words, for each partial term there corresponds a particular term of the record which contains that partial term and which is not used as a term to correspond with any other partial term. This one-for-one correspondence is a particular necessity in many problems of information retrieval, including the matrix problem described above. It is a feature of the present invention that the apparatus described herein can establish the existence of a set of terms in the record having a one-for-one correspondence with the set of partial terms being sought. Furthermore, the apparatus can perform this function even though one of the set of partial terms such as the term AB in FIG. 1 is completely contained within another set of partial terms, such as ABD in FIG. 1. Two terms of the set being sought may even be duplicates, and the apparatus will still seek and recognize only a complete set of record terms with one term in the record for each of the duplicated terms in the set being sought.

FIG. 2 provides another example seeking the same set of partial terms as in FIG. 1, but with a different set of terms in the record. The first term in the record of FIG. 2 is ABCD, and contains all three of the partial terms being sought. The second term in the record is ABE and contains only the first partial term AB. The third term of the record is ABFK and contains only the first partial term AB. After the third term is scanned, there has still not been located a set of terms in the record having one-for-one correspondence with the set of partial terms being sought, so that there is no match or compliance at this point. The next term in the record is ABDL, which contains the second partial term. Consequently, the first, second and fourth terms of the record constitute a set of terms having one-for-one correspondence with the partial terms being sought, as indicated by the circled X's in FIG. 2. The location of such a set of terms in the record is designated herein by the expression "compliance." The recognition of that set of terms in a record is said to establish compliance between that record and the set of partial terms being sought.

*FIGS. 3–4*

FIG. 3 is a table similar to FIGS. 1 and 2, illustrating the searching of a somewhat longer record for a different set of partial terms. FIG. 4 illustrates an apparatus constructed in accordance with the invention for performing the search operation indicated in tabular form in FIG. 3.

There is shown in FIG. 4 a reader 1 for receiving from any source (not shown) data which may be recorded in binary form, but which is illustrated as representing a series of alphabetical characters. The reader is shown as having twelve output terminals respectively identified as A, B, C, D, E, F, G, H, J, K, M and N. Such a reader is illustrated, for example, in the patent to Luhn et al., No. 2,994,429, mentioned above. See the comparing unit of FIG. 27 and the description beginning in column 38. Each of the groups of output terminals corresponding to the groups of characters in the set of partial terms being searched are connected through wires generally indicated at 2, to the input terminals of one of a set of matching registers 3, 4 and 5. Each matching register may be considered simply as an AND circuit, which produces a signal on its signal output terminal 3*a*, 4*a* or 5*a*, only when signals are received simultaneously on all its input lines. The signals from the output lines 3*a*, 4*a*, 5*a*, are directed through an electrical network controlled by and controlling a plurality of sets of storage registers. One of the sets of storage registers is shown as a set of three relays 6, 7 and 8. Another of the sets of storage registers is shown as another set of three relays 9, 10 and 11. The number of storage registers in each set must be equal to $n$, where $n$ is the number of partial terms in the combination being sought. Furthermore, the number of sets of storage registers must be at least equal to $n-1$.

While the storage registers are shown as relays in order to simplify the explanation, it will be understood by those skilled in the art that many suitable alternative devices may be used. It is only required that the storage register be a bistable device and that it be capable of controlling gates or other mechanisms for performing multiple switching functions. In the embodiment illustrated, the gates must be controlled so as to change their gating conditions in response to the receipt of the trailing edge of a square wave signal at the controlling relay. In this connection, although the relays 6 to 11 are shown as simple relays for the purpose of simplifying FIG. 4, each of these six relays must actually be somewhat more complex in order to switch its contacts in response to the trailing edge of the square wave signal. An electrical chain of relays suitable for substitution for one of the relays 6 to 11 so as to perform that function, is illustrated by way of example in FIG. 5. However, it will readily be understood by those skilled in the art that the same function can be performed by other equivalent mechanical or electrical means.

Each of the relays 6 to 11 controls a plurality of contacts, which are identified by alphabetical reference characters combined with the reference numeral of the relay. Thus, the relay 6 controls three contacts 6*a*, 6*b*, 6*c*. Each of the movable contacts controlled by any relay normally engages a stationary contact hereinafter referred to as a "back contact" and is movable from that position to engage another stationary contact hereinafter referred to as a "front contact."

The contacts of the relays, and their electrical connections, constitute an electrical network connecting the signal terminals 3*a*, 4*a*, 5*a* to the relays 6 to 11. The network is controlled by those relays to provide a further connection, when compliance has been found, between one of the signal terminals and an output terminal 12.

When the apparatus starts to scan a record, all the relays 6 to 11 have all their movable contacts engaging their back contacts. Under this condition, there is no completed electrical path through the network from any of the signal terminals 3*a*, 4*a*, 5*a*, to the output terminal 12. During the scanning of the first term of the record, the signals from the signal terminals 3*a*, 4*a*, 5*a* are transmitted to the relays 6, 7 and 8, respectively.

First consider the operation of the storage registers and the network in the simplest possible case, i.e., when only one of the maching registers produces an output signal in response to one term of the record being searched. If only one of the relays 6, 7 and 8 shifts its contacts in response to a signal from one of the terminals 3*a*, 4*a*, 5*a*, indicating identification in a term of the record of one of the partial terms being sought, then the actuation of that relay transfers the other two signal terminals to control the corresponding two storage registers relays of the second set (9, 10 and 11). As soon thereafter as any storage register relay in the second set transfers its contacts, then the one signal terminal 3*a*, 4*a* or 5*a*, which has not yet transmitted a signal to a storage register relay is connected through the network to the output terminal 12, so that as soon as a signal appears at that one signal terminal 3*a*, 4*a*, or 5*a*, it is transferred to the output terminal 12 and indicates that compliance has been established.

When the network is in its initial condition, the number of paths leading from one or the other of the three signal terminals 3*a*, 4*a* and 5*a* to the output terminal 12 is equal to the number of permutations in which the three partial terms may appear used to make up the necessary combination of three terms to establish compliance. When only one relay of a set of three is energized in response to a particular term of the record, the signal from that matching register terminal remains connected to that particular relay. As explained below in connection with FIG. 5, the relay is effectively latched. Further energization of that relay by subsequent energization of the same partial term are not effective to move its contacts. Such energization of only one relay in a set in response to a particular term of the record constitutes a distinctive identification of that term of the record as corresponding to one and only one partial term. The compliance problem is thereby advanced one step toward solution. Any subsequent identification of another term of the record with that same partial term cannot advance the compliance problem toward solution. Hence, signals of such subsequent identifications are transmitted to the relay which is effectively latched and are effectively ignored by the storage registers and by the network. The response of the network to such a positive identification of one partial term must be effective to ensure that the eventual signal to the output terminal 12 will come from a signal terminal other than the one corresponding to the identified term.

When a plurality of relays of a set are energized in response to a particular term of the record, then all of the signal terminals corresponding to previously unidentified signals are transferred to the next set of relays. Such an energization of a plurality of relays of one set constitutes a possible identification of a record term with any one of the partial terms corresponding to the relays so energized. The response of the network in such a case must not eliminate any signal terminal as the source of the final output signal, but must rather selectively reduce the number of paths to the output from the matching register corresponding to the possibly identified partial terms.

The network response to the energization of any relay or relays must leave available for possible completion a signal path to the output terminal corresponding to every remaining possible permutation of the partial terms not yet positively identified.

In order to explain the operation of the network of FIG. 4 in somewhat greater detail, the searching operation shown in tabular form in FIG. 3 will now be followed step by step through the circuit of FIG. 4. Note that the AND circuit 3 is set to produce an output signal whenever the first partial term ACD is found in the record being searched. The AND circuit 4 produces an output signal whenever the second partial term CF is found in the record. The AND circuit 5 produces an output signal whenever the third partial term ADF is found in the record.

Referring to FIG. 3, it may be seen that the first term searched in the record is ADE, which contains none of the three partial terms being sought. Consequently, no output signal is produced at any of the terminals 3*a*, 4*a*, 5*a*.

The second term of the record is CFK, which contains the second partial term being sought, so that the AND circuit 4 produces an output signal at the terminal 4*a*. This signal passes through back contact 8*c*, back contact 6*b* and a wire 13 to the relay 7. At the trailing edge of this square wave signal the relay 7 transfers its contacts 7*a*, 7*b*, 7*c* from their back contacts to their front contacts, thereby ensuring that the next signal from either of the terminals 3*a* or 5*a* will proceed to the relays 9 or 11, rather than to the relays 6 or 8, as would have been the case before the relay 7 transferred its contacts. Furthermore, all further signals from terminal 4*a*, until the apparatus is reset, are transmitted to relay 7, where they are ineffective. Under these conditions an identification of the second partial term CF in a subsequent term of the record will only result in another energization of relay 7, which will be ineffective since that relay has already transferred its contacts. Note that the identification of this partial term in the second term of the record was not accompanied by any identification of any other partial term, so that the second term of the record can serve in a compliance combination only to supply a term of the record corresponding to the second partial term.

The next term of the record being searched is illustrated as CEK, which does not contain any of the partial terms being sought, so that no signals are produced at the output terminals 3*a*, 4*a*, 5*a*.

The fourth term of the record being searched is ACDF, which contains all three of the partial terms being sought. Hence, signals will appear simultaneously at all three of the terminals 3*a*, 4*a*, 5*a*. The signal from terminal 3*a* passes through front contact 7*a*, back contact 8*a*, back contact 11*a*, and a wire 14 to the relay 9, which is thus actuated to transfer its contacts at the end of the signal from terminal 3*a*. The signal at terminal 4*a* is transmitted through back contact 8*c*, back contact 6*b* to wire 13 and thence to relay 7, where it is ineffective since relay 7 has already transferred its contacts. The signal from terminal 5*a* passes through back contact 6*c*, front contact 7*c* and back contact 9*c* to a wire 15 leading to relay 11. Note that since signals from terminals 3*a* and 5*a* are simultaneous, contact 9*c* is not yet transferred when the signal from 5*a* passes through it. Hence, after the fourth term of the record is scanned, the relays 7, 9 and 11 have transferred their contacts.

The fourth term of the record may serve as part of a compliance combination, either as a term corresponding to the first partial term ACD or as one corresponding to the third partial term ADF. Hence, the network should now be set up in a condition so that the receipt of a signal from either terminal 3*a*, or terminal 5*a* would be passed through output terminal 12, indicating that compliance has been established. The required path through the network from terminal 3*a* may be traced over front contact 7*a*, back contact 8*a*, front contact 11*a* and a wire 16 to output terminal 12. The required path through the network from terminal 5*a* may be traced over back contact 6*c*, front contact 7*c* and front contact 9*c* directly to output terminal 12.

The fifth term of the record, which is shown as CFK results in the production of a signal at terminal 4*a* at matching register 4. This signal is transmitted over back contact 8*c* and back contact 6*b* to wire 13 and relay 7, and is hence ineffective to change the condition of the network.

The sixth term of the record is ACDF, the same as the fourth term, and is effective to produce output signals at all three of the output terminals 3*a*, 4*a* and 5*a*. The output signals at 3*a* and 5*a* are transmitted through the network to the output terminal 12 along the paths traced above indicating that compliance has been established.

It may be seen that if the sixth term of the record were effective to produce a signal at either the terminal 3$a$ or the terminal 5$a$, that signal would be transmitted through the network to the output terminal 12, and compliance would be indicated.

*FIG. 5*

This figure illustrates the details in one of the latching relays shown as a single block at 6 to 11 in FIG. 4. Referring to FIG. 5, it may be seen that the single relay 6 includes a chain of three relays 17, 18 and 19. The relay 17 controls a single contact 17$a$. The relay 18 controls contacts 18$a$ and 18$b$. Relay 19 controls a contact 19$a$ and the network contacts such as 6$a$ which appear in FIG. 4.

When relay 17 is energized by a square wave signal, its contact 17$a$ completes an energizing circuit for relay winding 18 which may be traced from an ungrounded terminal of a battery 20 through the front contact 17$a$, relay winding 18 and ground to the opposite terminal of battery 20. Relay 18 is thereby energized and closes its contacts, completing a holding circuit for itself and preparing an energizing circuit for relay 19. The holding circuit for relay 18 may be traced from the ungrounded terminal of battery 20 through the front contact 18$a$, a contact 21$a$ of a reset switch 21 and thence through the winding of relay 18 to ground to the opposite terminal of battery 20.

Closure of contact 18$b$ prepares an energizing circuit for relay 19, which is not completed until the square wave input signal terminates, whereupon contact 17$a$ of relay 17 moves to engage its back contact. The energizing circuit for relay 19 may then be traced from battery 20 through back contact 17$a$ and front contact 18$b$ to relay 19 and thence through ground to the opposite terminal of battery 20. Energization of relay 19 shifts the contacts 6$a$, 6$b$ and 6$c$, and also closes contact 19$a$ against its front stationary contact, thereby establishing a holding circuit for the relay 19. This holding circuit may be traced from the ungrounded terminal of battery 20 through wires 22 and 23, contact 21$b$ of reset switch 21 and thence through front contact 19$a$ to the winding of relay 19 and through ground to the opposite terminal of battery 20. The relay 19 is now latched and will remain latched until the reset switch 21 is operated to open its contacts 21$a$ and 21$b$. It may be seen that the holding circuit of relay 19 is independent of contact 17$a$ of relay 17, so that further energizations of relay 17 do not disturb the positions of the contacts 6$a$, 6$b$, 6$c$.

After each search of the record is completed, whether compliance is established or not, the reset switches of all the storage register relays must be actuated to restore those relays to their initial conditions.

*FIG. 6*

This figure illustrates a modification of the information retrieval apparatus shown in FIG. 4, which is adaptable to seek and locate among the terms of a record a set of terms having one-for-one correspondence with either two, three or four partial terms.

Figure 6:
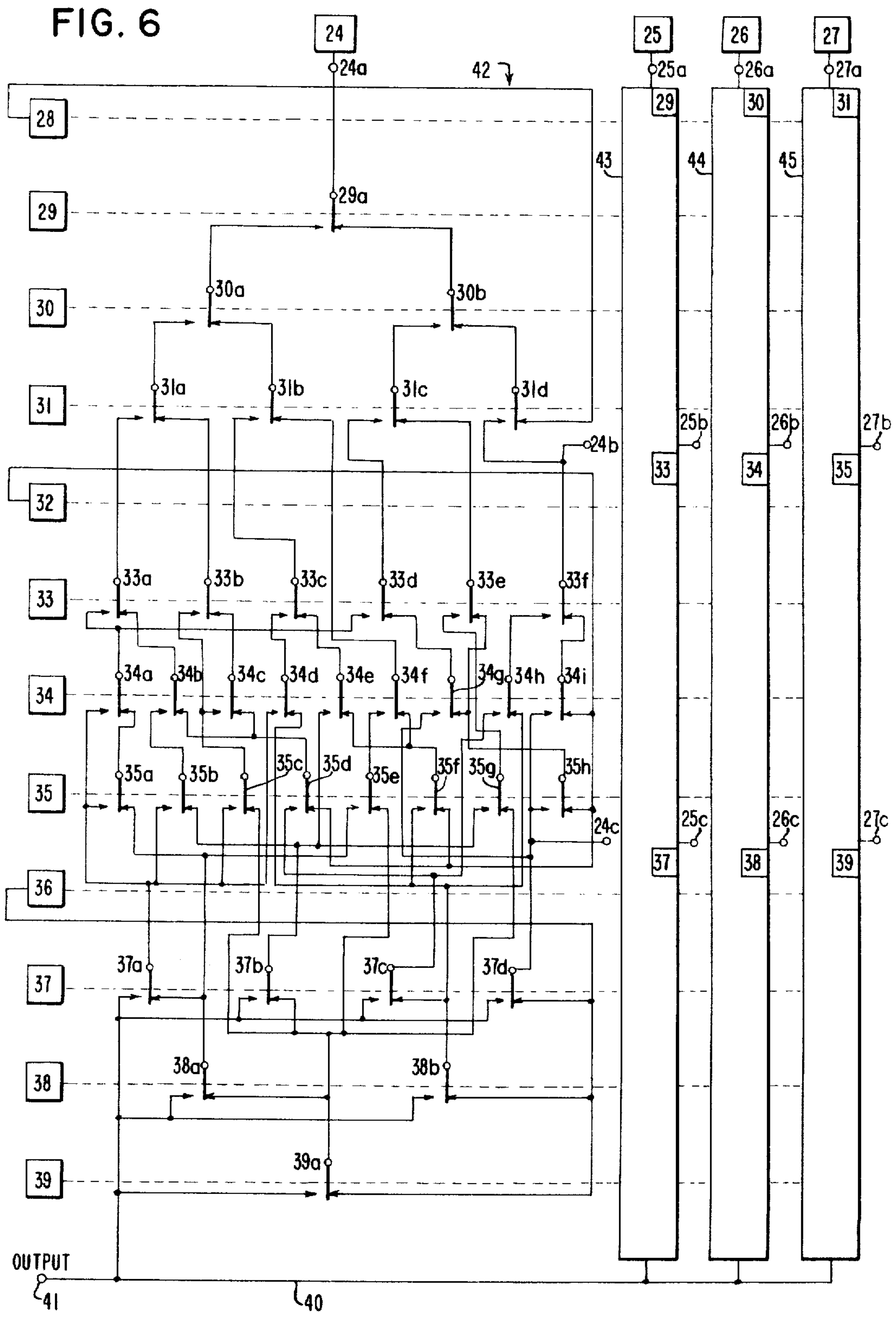
FIG. 6 is a somewhat schematic wiring diagram illustrating another embodiment of the invention, similar to that of FIG. 4, but somewhat more complex and capable of handling larger combinations of partial terms.

Four matching registers are shown in FIG. 6 at 24, 25, 26 and 27, corresponding to the four partial terms. These four matching registers have signal output terminals 24$a$, 25$a$, 26$a$ and 27$a$ respectively. The four signal output terminals are connected through four respectively corresponding networks 42, 43, 44 and 45 to a wire 40 connected to an output terminal 41. The complete network 42 is shown. The corresponding networks for the terminals 25$a$, 26$a$ and 27$a$ are shown respectively by blocks 43, 44 and 45.

The network for signal output terminals 24$a$ includes three sets of storage register relays, with four relays in each set. One of the sets is shown at 28, 29, 30 and 31, a second set at 32, 33, 34 and 35 and another set at 36, 37, 38 and 39. Each relay controls contacts bearing alphabetical designations after the reference numeral of the relay, as in the reference character system used in FIG. 4. The network 42 includes circuits for controlling the relays 28, 32 and 36. The network 43 includes circuits for controlling the relays 29, 33 and 37, as indicated by the tag labels in the block 43. Network 44 similarly controls the relays 30, 34 and 38, while network 45 controls relays 31, 35 and 39.

Networks 42, 43, 44 and 45 have a second set of input terminals 24$b$, 25$b$, 26$b$ and 27$b$. When the apparatus is to be used with a set of three partial terms, then the signal terminals 24$a$, 25$a$, 26$a$ and 27$a$, or rather the three of those four terminals which are to be used, should be bridged to the respective terminals 24$b$, 25$b$ and 27$b$. Another set of terminals 24$c$, 25$c$, 26$c$ and 27$c$ is provided for similar use when the apparatus is set to seek a combination of only two partial terms.

As in the case of the network of FIG. 4, the network of FIG. 6 must include a current path between one of the signal terminals 24$a$, 25$a$, 26$a$ and 27$a$ and the output terminal 41 for each possible permutation of the four partial terms being sought. As the partial terms are identified, that identification is established by energization of the relays 28 to 39, with a corresponding selection among the possible signal paths through the network, and a final completion of a signal path through the network when all but one of the partial terms had been identified, so that the next signal from the last term to be identified is effective to produce an output signal at the terminal 41.

It is believed unnecessary to trace the details of the network 42 shown in FIG. 6. The general scheme of operation is the same as that of the network shown in FIG. 4. A complete description of the operation of that network would require a consideration of each of the twenty-four possible permutations of input signals which might be received, and would tend to obscure the invention rather than explain it.

Instead of using $n-1$ sets of storage registers, an equivalent system could be devised using $n$ sets of storage registers, in which case the $n$th set of storage registers would be utilized to complete a circuit between an independent signal source and an output terminal.

While I have shown and described certain preferred embodiments of my invention, other modifications thereof will readily occur to those skilled in the art, and I therefore intend my invention to be limited only by the appended claims.

I claim:

1. Apparatus for ascertaining the presence or absence, in a record comprising at least $n$ terms, each containing a plurality of elements, of a set of $n$ terms containing, in one-for-one correspondence, a particular set of $n$ partial terms, where $n$ is an integer greater than 2, and at least one partial term contains a plurality of elements, comprising:

(a) matching register means for comparing each term of the record simultaneously with all of said set of partial terms and for producing a term identification signal whenever a match for a partial term is found within a term of the record;

(b) storage register means responsive to the term identification signals of said matching register means and effective to store all identifications which may contribute, in any permutation, to a set of $n$ term identifications corresponding to said set of $n$ partial terms; and (c) network means controlled by said storage register means and effective when said set of $n$ term identifications is complete to produce a compliance indicating signal.

2. Apparatus as defined in claim 1, in which:

(a) said matching register means includes $n$ matching registers;

(b) said storage register means includes at least $n-1$ sets of $n$ registers each; and (c) said network means includes:

(1) reset means operable to connect the matching register means initially to one set of storage registers;

(2) first transfer means effective upon identification of at least one partial term in a term of the record to transfer the connections of the matching register means to another set of storage registers; and (3) second transfer means effective upon storage of at least one identification in each of $n-1$ sets of said matching registers to transfer the connections of said matching register means to a compliance signal output terminal.

3. Apparatus as defined in claim 1, in which:

(a) said matching register means includes $m$ matching registers where $m$ is greater than $n$; and (b) said storage register means includes $m$ sets of $m$ registers each and a plurality of sets of selective input terminals corresponding to different values of $n$, each said set of input terminals being effective when used to reduce the number of active storage registers to $n-1$ sets of $n$ registers each.

4. Apparatus as defined in claim 2, including means effective upon positive identification of one term of the record with one and only one of the set of partial terms to block effectively all further identification signals from the matching register corresponding to said one partial term.

5. Apparatus as defined in claim 1, in which:

(a) said network means includes:

(1) an output terminal; and (2) a plurality of possible signal paths between the matching register means and the output terminal equal to the number of possible permutations of said $n$ partial terms; and (b) said storage register means is effective to reduce the number of said possible paths in response to the number of identified partials terms, so that the number of possible paths remaining at any time is determined by the number of unidentified terms.

No references cited.

ROBERT C. BAILEY, *Primary Examiner.*

P. J. HENON, *Assistant Examiner.*